United States Patent
Patru et al.

(10) Patent No.: US 12,509,782 B2
(45) Date of Patent: Dec. 30, 2025

(54) CO-ELECTROLYSIS CELL DESIGN FOR EFFICIENT CO2 REDUCTION FROM GAS PHASE AT LOW TEMPERATURE

(71) Applicant: PAUL SCHERRER INSTITUT, Villigen Psi (CH)

(72) Inventors: Alexandra Patru, Windisch (CH); Thomas Justus Schmidt, Kleindoettingen (CH); Tobias Binninger, Zurich (CH); Bernhard Pribyl, Turgi (CH)

(73) Assignee: Paul Scherrer Institut, Villigen PSI (CH)

( * ) Notice: Subject to any disclaimer, the term of this patent is extended or adjusted under 35 U.S.C. 154(b) by 624 days.

(21) Appl. No.: 16/633,617

(22) PCT Filed: May 24, 2018

(86) PCT No.: PCT/EP2018/063598
§ 371 (c)(1),
(2) Date: Jan. 24, 2020

(87) PCT Pub. No.: WO2019/020239
PCT Pub. Date: Jan. 31, 2019

(65) Prior Publication Data
US 2020/0308718 A1    Oct. 1, 2020

(30) Foreign Application Priority Data
Jul. 24, 2017 (EP) .................................... 17182823

(51) Int. Cl.
*C25B 9/23* (2021.01)
*C25B 1/00* (2021.01)
(Continued)

(52) U.S. Cl.
CPC .................. *C25B 9/23* (2021.01); *C25B 1/00* (2013.01); *C25B 3/25* (2021.01); *C25B 11/095* (2021.01)

(58) Field of Classification Search
CPC ................ C25B 3/25; C25B 3/26; C25B 9/23
See application file for complete search history.

(56) References Cited

U.S. PATENT DOCUMENTS 4,166,014 A  *  8/1979  Sata .......................... C25B 1/46
                                                      205/521
4,386,987 A  *  6/1983  Covitch ................ H01M 50/46
                                                      156/704
(Continued)

FOREIGN PATENT DOCUMENTS

WO        2016039999 A1      3/2016

*Primary Examiner* — Luan V Van
*Assistant Examiner* — Mofoluwaso S Jebutu
(74) *Attorney, Agent, or Firm* — Laurence A. Greenberg; Werner H. Stemer; Ralph E. Locher

(57) ABSTRACT

A membrane electrode assembly for an electrochemical cell, in particular a co-electrolysis cell for $CO_2$ reduction reaction, can overcome the problem of parasitic $CO_2$ pumping from cathode to anode side and, at the same time, maintain good Faradaic efficiency towards $CO_2$ reduction reaction in a co-electrolysis system where pure or diluted gaseous $CO_2$ is used. The assembly includes an MEA, having an anode, a cathode, a polymer ion exchange membrane between cathode and anode, an additional ion exchange polymer film between the cathode and the polymer ion exchange membrane and a discontinuous interface formed between the additional polymer film located at the cathode side and the ion exchange membrane.

5 Claims, 3 Drawing Sheets

Figure 1:
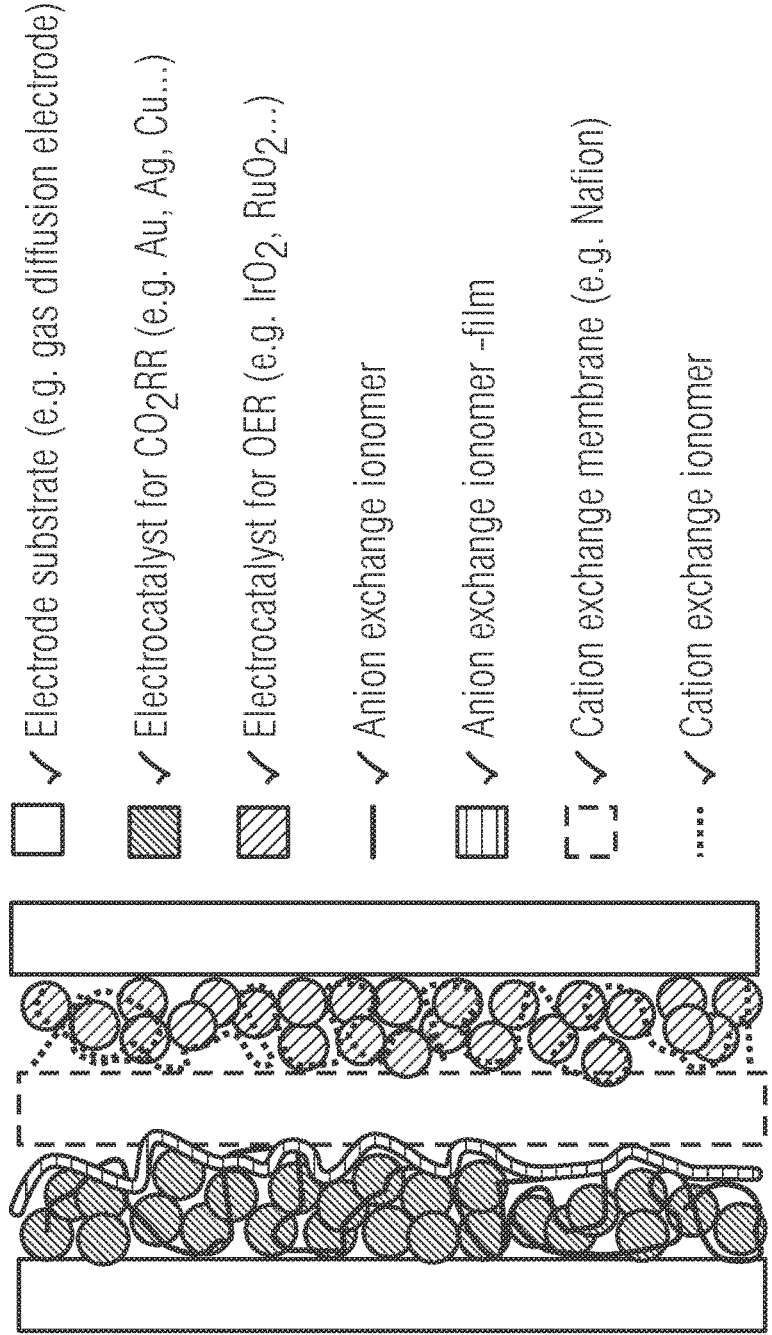

☐ ✓ Electrode substrate (e.g. gas diffusion electrode)

▨ ✓ Electrocatalyst for $CO_2RR$ (e.g. Au, Ag, Cu...)

▧ ✓ Electrocatalyst for OER (e.g. $IrO_2$, $RuO_2$...)

— ✓ Anion exchange ionomer

▭ ✓ Anion exchange ionomer -film

⊡ ✓ Cation exchange membrane (e.g. Nafion)

⋯ ✓ Cation exchange ionomer

(51) Int. Cl.
*C25B 3/25* (2021.01)
*C25B 11/095* (2021.01)

(56) References Cited

U.S. PATENT DOCUMENTS

| | | | | |
|---|---|---|---|---|
| 6,103,078 | A * | 8/2000 | Hitchems | H01M 8/1023 |
| | | | | 429/513 |
| 6,524,736 | B1 * | 2/2003 | Sompalli | H01M 4/8828 |
| | | | | 429/535 |
| 2013/0202984 | A1 * | 8/2013 | Snelson | H01M 4/8896 |
| | | | | 156/60 |
| 2015/0064581 | A1 * | 3/2015 | Unlu | H01M 8/1032 |
| | | | | 429/414 |
| 2016/0369415 | A1 | 12/2016 | Masel et al. | |
| 2017/0321334 | A1 * | 11/2017 | Kuhl | C25B 11/057 |
| 2019/0118144 | A1 * | 4/2019 | Kishino | B01J 39/20 |
| 2020/0318247 | A1 * | 10/2020 | Fernández Sanchis | |
| | | | | C25B 11/031 |

* cited by examiner

CO-ELECTROLYSIS CELL DESIGN FOR EFFICIENT CO2 REDUCTION FROM GAS PHASE AT LOW TEMPERATURE

The present invention relates to the design of a membrane electrode assembly (MEA) unit for an electrochemical co-electrolyser operating at high current density with good product selectivity using $CO_2$ in the gas phase.

Electrochemical $CO_2$ reduction reaction ($CO_2RR$) is a complex reaction which must be carried out in a highly selective and efficient manner. The device on which the electrochemical $CO_2$ reduction can be integrated is called a co-electrolysis system. In such a system $CO_2RR$ takes place at the cathode side, ideally directly from the gas phase, while at the anode side oxygen is evolved from water. Actually, in many designs of co-electrolysis systems $CO_2RR$ takes place entirely in liquid phase utilizing $CO_2$ dissolved in aqueous, organic, or ionic liquid electrolytes. The efficiency of co-electrolysis systems using $CO_2$ dissolved in liquid phase is generally limited by the low $CO_2$ solubility in the liquid electrolyte.

Devices for electrochemical reduction of $CO_2$ from gas phase are generally inspired by the fuel cell architecture. They contain a membrane electrode assembly (MEA) which comprises a cathode electrode, an anode electrode and a polymer electrolyte layer in-between. In a co-electrolyser, the cathode is the negative electrode where the $CO_2RR$ takes place in concurrence with the hydrogen evolution reaction (HER). In most cases, the oxygen evolution reaction (OER) takes place at the anode side, but other oxidation reactions can also be used (e.g. hydrogen oxidation reaction). The polymer electrolyte acts as an electronic isolator between the anode and the cathode, as well as an ion conductor allowing ions to pass between the electrodes and maintaining the electrochemical reactions. The chemical nature of the polymer electrolyte dictates the pH at which the electrochemical reactions are taking place. Flow fields and gas diffusion layers (GDLs) are generally placed at each side of the MEA, which are used to efficiently transport reactants and products to/from the electrode surfaces where the reactions are taking place.

The cathode side is fed with humidified $CO_2$ gas and at the anode side reactants such as water or hydrogen gas are provided as well. When electrical energy is applied to the system, water and $CO_2$ are reduced at the cathode side, generating for example CO and $H_2$.

In gas phase, the $CO_2RR$ takes place in the cathode catalyst layer at the catalyst/electrolyte contact interface to which $CO_2$ is supplied from the gas phase inside the electrode pore structure. The contact area between catalyst and the polymer electrolyte membrane is limited. In order to increase the catalytically active area, electrolyte is also directly mixed into the electrode catalyst layers. Since most liquid electrolytes suffer from evaporation in a gas phase environment and they can creep out of the electrode catalyst layers, the use of solid electrolytes such as ion-conducting polymers, so-called ionomers, which are capable of exchanging ions between the catalyst layer and the polymer electrolyte membrane, is advantageous for these purposes.

Thus, ionomers are reasonably integrated into the co-electrolyser system in two manners:
 i) using an ionomer membrane between anode and cathode
 ii) incorporating ionomers directly into the cathode/anode catalyst layers.

The type of ionomer and the way it is used in a co-electrolyser plays a key role in such a system. Since the $CO_2RR$ is known to be more efficient in alkaline conditions, different polymeric anion exchange membranes (AEMs) have been applied in gas phase co-electrolysis, which are chemically designed to conduct anions (e.g. $OH^-$, $HCO_3^-$, $CO_3^{2-}$). Good results were achieved with such types of membranes and Faradaic efficiency (FE) of up to 98% for CO production has been reported. In some cases the alkaline ionomer was also incorporated into the electrode catalytic layers[3].

However, such purely alkaline configurations impose a severe problem, which is related to the release of $CO_2$ at the anode side. When equilibrated with a base, the AEM anions are in the form of $OH^-$ and the membrane provides alkaline conditions, which are beneficial for $CO_2RR$. However, when such an alkaline ionomer is used in a co-electolyser, the mobile anions will be in the form of carbonate/bicarbonate due to the large presence of $CO_2$ gas as explained in the following.

At the cathode side, e.g., the following electrochemical reactions can occur[4]:

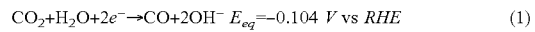

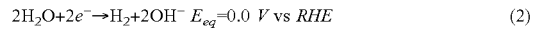

It is clear from reaction 1 that the reduction of one molecule of $CO_2$ to CO leads to the formation of two $OH^-$. In abundance of $CO_2$ these $OH^-$ are transformed into carbonate/bicarbonate anions according to reactions 3 and 4:

The carbonate/bicarbonate anions are transported by migration, i.e. as part of the electrical ion current, through the polymer electrolyte to the anode side where they are oxidized into $O_2$ and $CO_2$ according to reactions 5 and 6:

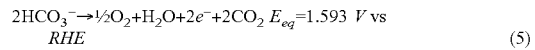

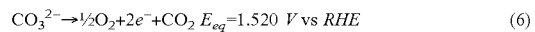

Considering the overall $CO_2$ balance in the system reveals that for each $CO_2$ molecule being reduced to CO, one or two other $CO_2$ molecules are transported to the anode side in the form of carbonate/bicarbonate and consequently released in the form of $CO_2$. This parasitic "$CO_2$ pumping" from cathode to anode side provides a loss channel for $CO_2$ and, therefore, makes AEM co-electrolyser systems inefficient for the desired electrochemical reduction of $CO_2$. The formation of $CO_2$ at the anode side as a result of this $CO_2$ pumping effect was proven in an AEM co-electrolysis system and the results are shown in section Example 2.

One solution to mitigate this problem of $CO_2$ pumping while maintaining alkaline conditions at the cathode is the use of a bipolar membrane instead of an entirely alkaline membrane in a co-electrolyser with the acidic side of the membrane facing towards the anode and the alkaline side of the membrane facing towards the cathode. Although the use of bipolar membranes in co-electrolysers has been already disclosed in the international patent application WO 2016/039999 A1 (D1), the issue of $CO_2$ production at the anode side was not addressed in this patent application.

In principle, the acidic part of the bipolar membrane prevents the transport of carbonate/bicarbonate species all the way to the anode. Instead, at the internal interface of the bipolar membrane between the alkaline and the acidic layers, carbonate/bicarbonate anions react with protons from the acidic side to form water and $CO_2$:

$$HCO_3^- + H^+ \rightarrow H_2O + CO_2 \quad (7)$$

$$CO_3^{2-} + 2H^+ \rightarrow H_2O + CO_2 \quad (8)$$

Thus, in the case of bipolar membrane co-electrolysis, $CO_2$ and $H_2O$ are formed at the internal alkaline/acidic interface of the bipolar membrane. This can lead to two different problems: Firstly, the formation of $CO_2$ and $H_2O$ at the internal interface of the bipolar membrane can result in the delamination of the alkaline and acidic layers, and secondly, the $CO_2$ has to diffuse away from the internal interface either to the cathode or to the anode side. In case of similar $CO_2$ diffusion properties and similar thicknesses of the alkaline and acidic layers of the bipolar membrane, it could be estimated that roughly 50% of the $CO_2$ formed at the alkaline/acidic interface will diffuse to the cathode side and 50% to the anode side.

Thus, even in such a bipolar membrane configuration, a significant amount of $CO_2$ is lost by mixed migration-diffusion transport from the cathode side to the anode side, which was confirmed by our results shown in section Example 2.

It is the objective of the present invention to provide a new design for an electrochemical cell, in particular a co-electrolysis cell for $CO_2RR$, that can overcome these problems and, at the same time, maintain good Faradaic efficiency towards $CO_2RR$ in a co-electrolysis system, using pure or diluted gaseous $CO_2$.

This objective is achieved according to the present invention by an electrochemical co-electrolysis cell for the reduction of carbon dioxide containing a membrane electrode assembly (MEA),
a) said MEA comprising an anode electrode layer, a cathode electrode layer, and a cation exchange polymer membrane between the anode electrode layer and the cathode electrode layer, wherein
b) the cathode electrode layer comprises a mixture of a cathode catalyst material and an anion exchange ionomer, wherein the distribution of the anion exchange ionomer within the cathode electrode layer is such that this anion exchange ionomer (i) forms a discontinuous contact interface with the cation exchange polymer membrane and (ii) separates the cathode catalyst material from the cation exchange polymer membrane.

This objective is further achieved according to the present invention by a membrane electrode assembly (MEA) comprising an anode electrode layer, a cathode electrode layer and a ionic conductive polymer membrane between the anode electrode layer and the cathode electrode layer, wherein the ionic conductive polymer membrane is formed of two layers of different ionic conductive polymers forming a discontinuous polymeric interface between the two layers of different ionic conductive polymers.

Preferably, one of the two layers of different ionic conductive polymers is an anionic conductive polymer being in contact with a cathode catalyst layer comprised in the cathode electrode layer, and
b) the other of the two layers of different ionic conductive polymers is a cationic conductive layer being in contact with the anode electrode layer.

One further preferred embodiment provides the membrane electrode assembly wherein one of the sides of the cathode electrode layer is in contact with the anionic polymer film and has a 3D porous structure comprising a catalytic active powder and an anionic conductive polymer.

Furthermore, the anionic conductive layer may be approx. 10% of the thickness of the cationic polymer layer and it takes the porosity of the cathode catalyst layer on which it is deposited.

The present invention further provides a process for fabricating a membrane electrode assembly (MEA), comprising the steps of:
i) fabricating a cathode gas diffusion electrode by coating a mixture of cathode catalyst material and anion exchange ionomer onto one side of a gas diffusion layer,
ii) applying an additional coating of anion exchange ionomer onto this cathode gas diffusion electrode, and
iii) bringing the anion exchange ionomer-coated side of the cathode gas diffusion electrode in contact with one side of a cation exchange polymer membrane, and
iv) bringing the opposite side of the cation exchange polymer membrane in contact with an anode electrode layer.

Typically, the cell and the MEA can be operated by providing carbon dioxide in gas phase to the cathode and electrical energy is applied to electrochemically reduce the carbon dioxide.

In a preferred embodiment of the present invention, an "acidic" cation exchange polymer membrane is used as electrolyte membrane separating cathode and anode. This acidic polymer membrane suppresses the undesired parasitic carbon dioxide pumping from cathode to anode side that provided an undesired loss channel for $CO_2$ in anion exchange membrane or bipolar membrane cells.

Furthermore, in a preferred embodiment of the present invention, an anion exchange ionomer is mixed into the cathode catalyst layer in order to provide optimal environment for $CO_2RR$. This design provides an additional thin ionomer film that covers the surface of the cathode catalyst layer towards the polymer ion exchange membrane and that preferably comprises of anion exchange ionomer. This anion exchange ionomer film prevents direct contact between the catalyst content in the cathode and the preferably acidic polymer electrolyte membrane, thus avoiding an increased fraction of hydrogen evolution and maintaining good Faradaic efficiency towards $CO_2RR$ compared to cation exchange membrane cells without this additional anion exchange ionomer film.

In a preferred embodiment of the present invention this additional thin ionomer film is a continuous anion exchange polymer film covering the porous cathodic catalyst layer and its thickness must be controlled in a way that is not drastically modifying the shape of the catalytic layer at a micrometric scale (e.g. the ionomer film keep the shape of the catalytic layer)

Preferably, this ion exchange polymer film between the cathode and the polymer ion exchange membrane has a morphology adjusted to the rough surface morphology of the cathode catalyst layer. Furthermore, this ion exchange polymer film between the cathode and the polymer ion exchange membrane can be prepared by deposition onto a previously prepared cathode catalyst layer; the deposition of the film is preferably carried out by spray-coating.

Advantageously, the cathode can be formed as a cathode catalyst layer which comprises one or more catalytically active elements and an ion conducting polymer. Preferably, the catalytically active elements comprise one or more of Au, Ag, Cu, Sn, Zn, Bi, Mo, Cd, Hf, Ta, W, C, Nb, Fe, Co, Ni, Ir, Ru, Pt, Si, Cr, In, Rh and B. Further, the mass of the ion conducting polymer can varies between 1% and 95% of the total mass of all other elements in the cathode catalyst layer. The ion conducting polymer can be an anion exchange polymer comprising positively charged groups, such as amine, quaternary ammonium, imidazolium, pyridinium groups.

Additionally, the anion conducting polymer film between said cathode and said polymer ion exchange membrane may comprise positively charged groups, such as amine, quaternary ammonium, imidazolium, pyridinium groups, but not limited to this.

The cell can be advantageously operated to yield products of electrolysis operation which comprise one or more of CO, $H_2$, $HCOO^-$, HCOOH, $CH_3OH$, $C_2H_5OH$, $CH_4$, $C_2H_4$, $C_2H_6$, $CH_3COO^-$, $CH_3COOH$, $O_2$.

It is also possible to operate the cell as an electrolyser or a fuel cell. In case of fuel cell operation, the same electrode of the cell is preferably used as cathode as in the case of co-electrolyser operation.

Figure 2:
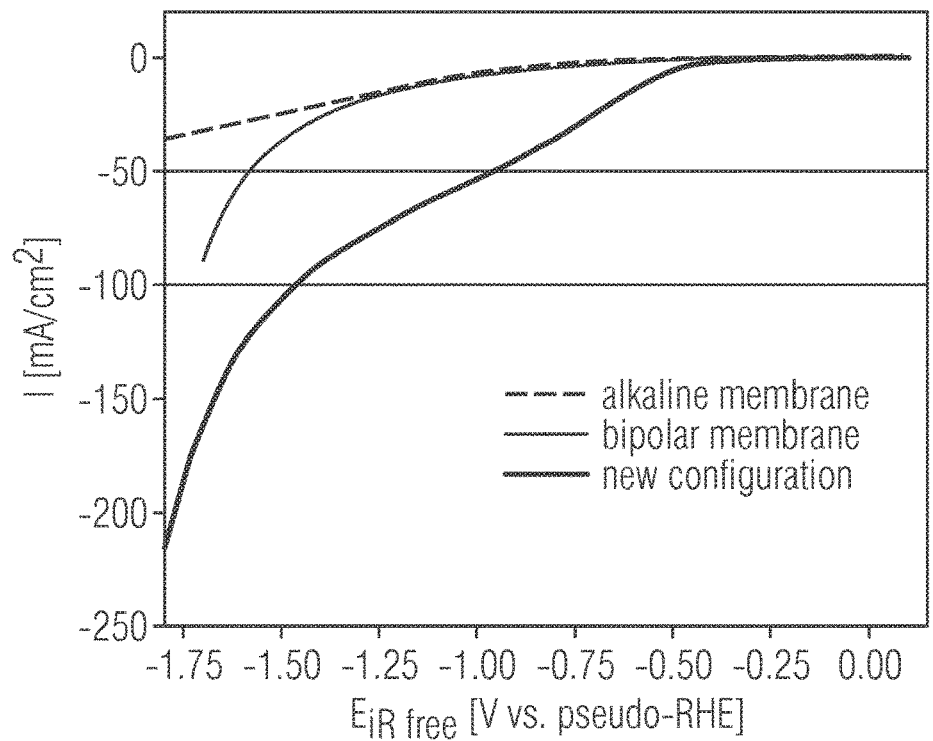
Figure 3:
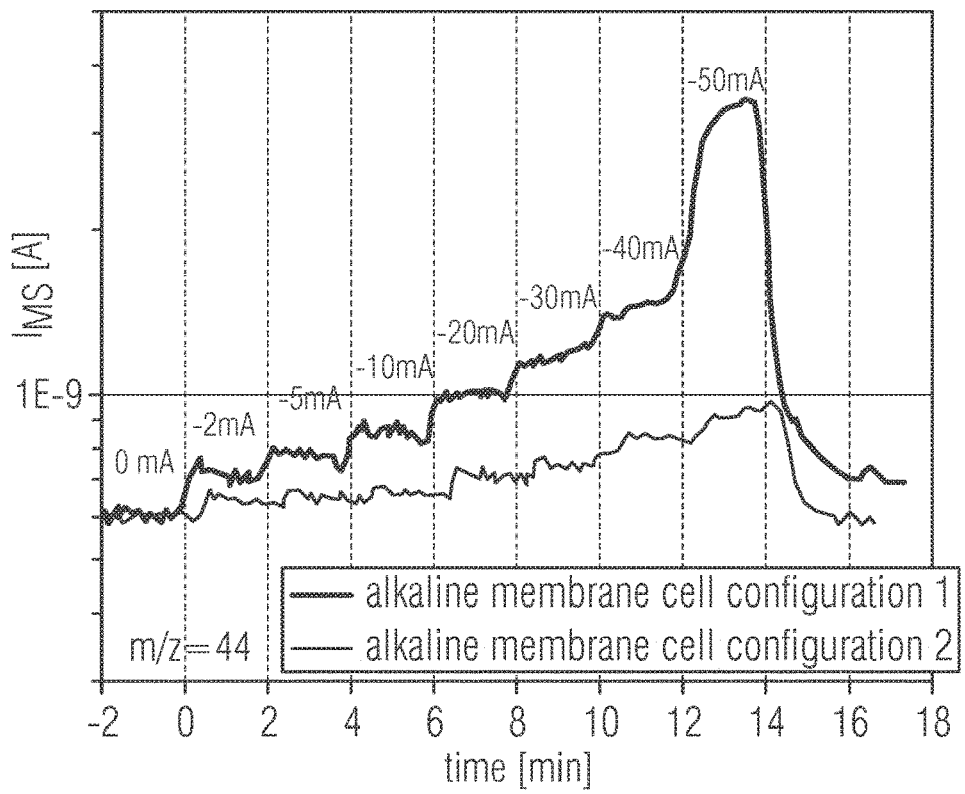
Figure 4:
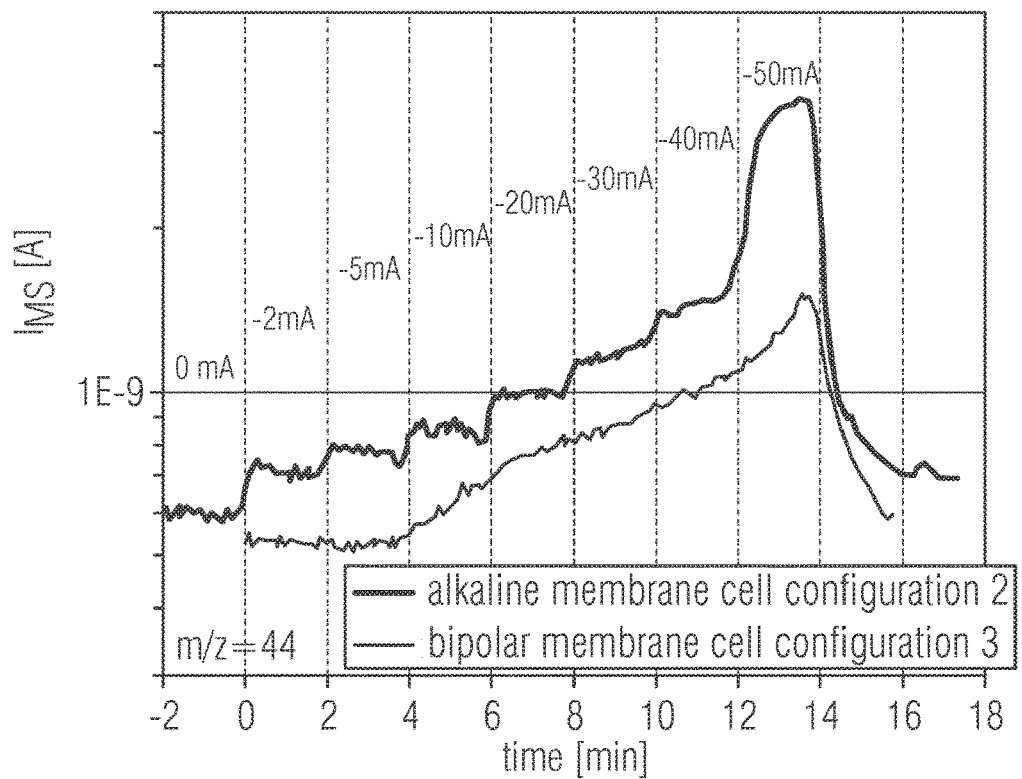
Figure 5:
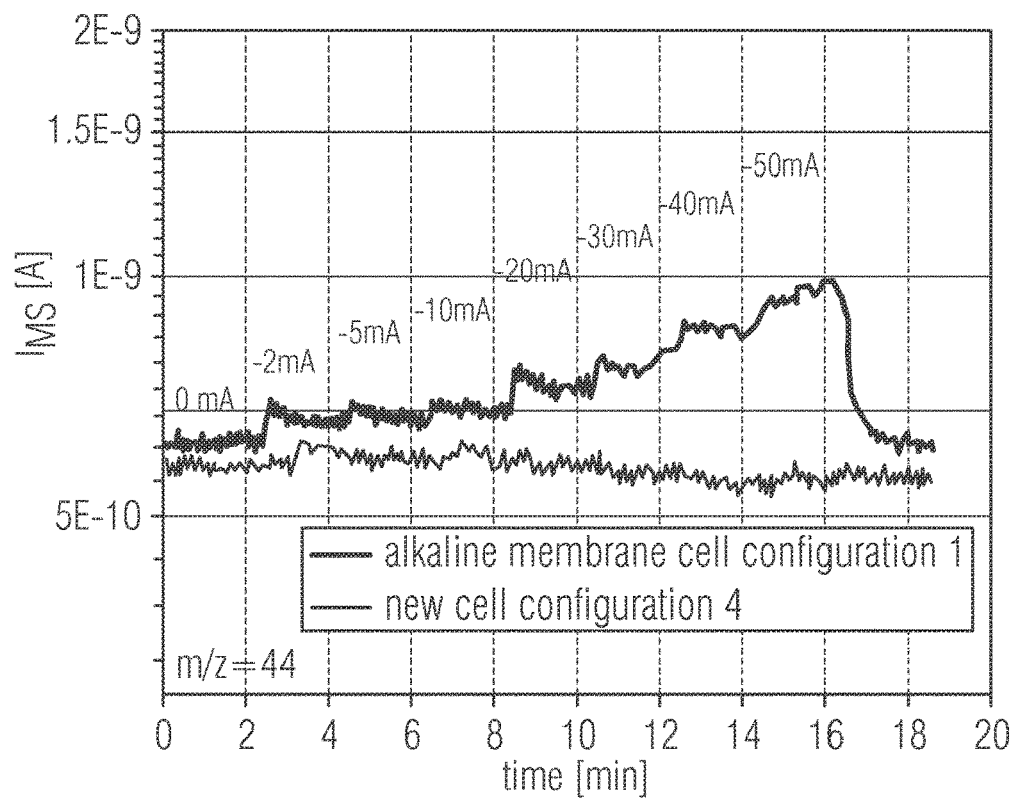

Preferred embodiments of the present invention are hereinafter described in more detail with reference to the attached drawing which depicts in:

FIG. 1 a schematic of the MEA of a novel co-electrolysis system design for electrochemical $CO_2$ reduction from the gas phase;

FIG. 2 the electrochemical cyclic voltammetry performances of the different cell configurations tested for $CO_2$ reduction from gas phase;

FIG. 3 the MS ion current corresponding to $CO_2$ mass fraction (m/z=44) detected at the anode of a co-electrolysis cell using an alkaline membrane with different anode configurations: Pt/C anode catalyst fed with $H_2$ (blue), and $IrTiO_2$ anode catalyst fed with highly humidified $N_2$ (black);

FIG. 4 the MS ion current corresponding to $CO_2$ mass fraction (m/z=44) detected at the anode of a co-electrolysis cell once with an alkaline membrane (black), and once with a bipolar membrane (red); in both cases, the anode electrodes contain $IrTiO_2$ catalyst for oxygen evolution and the anode side is fed with highly humidified $N_2$;

FIG. 5 the MS ion current corresponding to $CO_2$ mass fraction (m/z=44) detected at the anode of a co-electrolysis cell once using an alkaline membrane (black), and once constructed in the new cell configuration according to the invention (red); in both cases, the anodes consist of Pt/C electrodes fed with $H_2$ gas.

The electrochemical reduction of $CO_2$ results in products such as CO and $H_2$, known as "syngas" that can be further converted to fuels and chemicals via industrial processes like Fischer-Tropsch, methane, ethylene, alcohols or other useful chemicals. The selectivity of the $CO_2RR$ mainly depends on the type of electrocatalyst. The co-electrolysis cell disclosed according to the present invention can be used for the production of various types of chemicals, not exclusively syngas.

The invention comprises a membrane electrode assembly comprising the following parts as shown in FIG. 1:
a) a cathode based on powder electrocatalyst active for $CO_2RR$; the powder electrocatalyst is mixed with an anion exchange ionomer (which can be in $OH^-$, $HCO_3^-$, $CO_3^{2-}$, or other anionic form) and solvents to form a slurry or ink;
b) an electrically conductive porous gas diffusion substrate (carbon gas diffusion layer, titanium, etc.) onto which the slurry/ink is deposited on one side to form a gas diffusion electrode structure containing the anion exchange ionomer within the electrocatalyst layer;
c) an additional thin film of anion exchange ionomer deposited, e.g. by spray coating, directly on top of the cathode catalyst layer of the gas diffusion electrode prepared in steps a) and b). This ionomer thin film covers the surface of the cathode catalyst layer towards the membrane, thus avoiding direct contact between the cathode catalyst and the membrane. Furthermore, this ionomer thin film adjusts to the rough surface morphology of the cathode catalyst layer;
d) a cation exchange membrane between the cathode side, including the additional anion exchange ionomer thin film of step c), and the anode side;
e) an anode based on electrocatalyst active for an oxidative counter reaction for the $CO_2RR$, such as $IrO_2$, $RuO_2$, or a mix thereof for the oxygen evolution reaction (OER), or Pt-based catalysts for the hydrogen oxidation reaction (HOR).

This specific rational design of the cathode is expected to combine several advantages: Firstly, high catalytically active surface area for the $CO_2RR$ is provided by the "alkaline" anion exchange ionomer within the cathode catalyst layer providing an optimal alkaline environment for the reduction of $CO_2$, which is supplied directly from gas phase through the cathode gas diffusion layer (CGDL) to the cathode catalyst layer. Secondly, the additional thin film of "alkaline" anion exchange ionomer protects the cathode catalyst from direct contact with the "acidic" cation exchange membrane. This prevention of direct contact is highly important, because, due to the high proton activity of the acidic membrane, direct contact would result in an increased fraction of hydrogen evolution, thus strongly deteriorating the Faradaic efficiency towards $CO_2RR$.

Thirdly, the cation exchange membrane guarantees that the carbonate/bicarbonate anions from the alkaline cathode ionomer are stopped from being transferred to the anode side, thus avoiding parasitic $CO_2$ pumping from cathode to anode side. Instead, carbonate/bicarbonate anions are transported within the cathode alkaline ionomer only to the interface between the additional alkaline ionomer thin film and the acidic membrane where they react with protons to form $H_2O$ and $CO_2$ according to reactions 7 and 8 above. Since the morphology of the alkaline ionomer thin film is adjusted to the rough surface of the cathode catalyst layer, its interface with the flat two-dimensional acidic membrane is established by discontinuous local contact areas. The spot-like character of this interface is highly beneficial, because $CO_2$ and $H_2O$, formed there according to reactions 7 and 8, can laterally escape "in plane" at the perimeter of these interface spots back to the cathode electrode pore structure. In this way, both delamination of the alkaline/acidic interface and significant $CO_2$ diffusion to the anode side are prevented. Finally, the use of a cation exchange membrane provides lower electrical resistance than state-of-the-art anion exchange membranes or bipolar membranes enabling increased energetic efficiency of the proposed co-electrolysis cell design.

EXAMPLE 1

MEA Manufacture

Cell "New Configuration" According To Invention

Cathode electrode assemblies were fabricated by spraying on a GDL substrate (Sigracet® 24 BC) an ink comprising gold black nanoparticles (Sigma Aldrich®), an anion exchange ionomer (Fumasep®) in $HCO_3^-$ form (10 wt % w.r.t. Au catalyst mass) and Milli-Q® water. The final loading of Au nanoparticles on the electrode was approx. 3 mg/cm². The electrode was dried under an air flow for several hours.

Subsequently, a solution of anion exchange ionomer (Fumasep®) in $HCO_3^-$ form (5 wt % in ethanol) was sprayed on top of the gold catalyst layer and dried under air flow for one hour. The anode side was a commercial gas diffusion electrode (GDE) Pt/C (Johnson Matthey®) with a catalyst loading of 0.4 $mg_{pt}/cm^2$.

The cathode electrode assembly and the anode GDE were placed on both sides of a Nafion® XL 100 membrane, with their respective catalyst layers facing towards the membrane, and tested in an electrochemical laboratory cell. The active cell area was 0.5 $cm^2$. For comparison, two other cells were built with the following compositions:

Cell "Alkaline Membrane"
- Cathode: Au black catalyst layer containing 10 wt % of anion exchange ionomer (Fumasep®) deposited on a GDL substrate
- Membrane: Anion exchange membrane used in carbonate form (Fumasep AA 30®)
- Anode: Pt/C GDE (Johnson Matthey®)

Cell "Bipolar Membrane"
- Cathode: Au black catalyst layer containing 10 wt % of anion exchange ionomer (Fumasep®) deposited on a GDL substrate
- Membrane: Bipolar membrane (Fumasep® 130 µm) with the anion exchange side in contact with the cathode and the cation exchange side in contact with the anode
- Anode: Pt/C GDE (Johnson Matthey®)

Operation Conditions

The cell was operated at 40° C. and ambient pressure. The cathode was fed with a 50/50 vol % mixture of $CO_2$/Ar at 10 ml/min and the anode side was fed with pure $H_2$ at 50 ml/min. Both gases were 100% humidified. In this operation mode, the anode serves both as counter electrode and as reference electrode, corresponding to a pseudo-reversible hydrogen electrode (pseudo-RHE). A Biologic SP 300 potentiostat was used for all electrochemical measurements. Polarization curves were recorded with the cathode as working electrode using cyclic voltammetry in potentiostatic mode. Galvanostatic measurements at fixed currents were also performed in order to analyze the cell efficiency and short term stability.

Product Gas Analysis

The exhaust cathode gases were analyzed by on-line mass spectrometry (MS). FIG. 2 shows the electrochemical cyclic voltammetry performances of the different cell configurations and Table 1 summarizes the CO selectivities and cell voltages obtained in galvanostatic mode at different fixed current densities. The CO selectivity values were calculated based on MS analysis of the exhaust cathode gases after 15 min of operation at each current density (i.e. −50 $mA/cm^2$, −100 $mA/cm^2$, −200 $mA/cm^2$). The cell voltages given in Table 1 are not iR-corrected in order to be able to assess the different membrane configuration performances.

TABLE 1

Cell performances obtained in galvanostatic mode at various fixed current densities.

| Cell configuration | Current density [mA/cm²] | CO selectivity* [%] | Cathode potential [V vs. pseudo-RHE] |
|---|---|---|---|
| Alkaline membrane | −50 | 12.2 | −1.875 |
|  | −100 | 4.3 | −2.24 |
|  | −200 | — | — |
| Bipolar membrane | −50 | 13.6 | −1.857 |
|  | −100 | 4.2 | −2.216 |
|  | −200 | 2 | −3.2 |
| New configuration | −50 | 11 | −1.278 |
|  | −100 | 6 | −1.44 |
|  | −200 | 3.6 | −1.820 |

*CO selectivity = mol % CO/(mol % CO + mol % $H_2$)

The CO selectivities were very similar for all three cell configurations. This preservation of CO selectivity demonstrates that the additional anion exchange ionomer thin film between the cathode catalyst layer and the acidic membrane in the new cell configuration was effective to prevent increased $H_2$ evolution by preventing direct contact between the cathode catalyst and the acidic membrane. At the same time, in the case of the new configuration, the energetic efficiency was highly improved: At −50 $mA/cm^2$ a cathode potential of only −1.3 V vs. pseudo-RHE was required for the new configuration compared to −1.9 V vs. pseudo-RHE for both other configurations.

Example 2—Parasitic $CO_2$ Pumping to the Anode Side

Various cell configurations (similar to the ones described in Example 1) were tested to investigate the parasitic $CO_2$ pumping to the anode side. The exhaust anode gas analysis was done by MS for the following cell configurations:

1. Au cathode//alkaline anion exchange membrane//Pt/C GDE anode. The cathode compartment was fed with pure $CO_2$ gas at a flow of 10 ml/min and 100% relative humidity (RH), while the anode compartment was fed with pure $H_2$ at 10 ml/min and 100% RH.
2. Au cathode//alkaline anion exchange membrane//Ir-$TiO_2$ anode (approx. 7 $mg_{IrTiO2}/cm^2$). The cathode compartment was fed with pure $CO_2$ gas at a flow of 10 ml/min and 100% RH, while the anode compartment was fed with pure $N_2$ at 10 ml/min and minimum 100% RH.
3. Au cathode//bipolar membrane//$IrTiO_2$ anode (approx. 7 $mg_{IrTiO2}/cm^2$). The bipolar membrane was used with the acidic side of the membrane facing towards the anode and the alkaline side of the membrane facing towards the cathode. The cathode compartment was fed with pure $CO_2$ gas at a flow of 10 ml/min and 100% RH, while the anode compartment was fed with pure $N_2$ at 10 ml/min and minimum 100% RH.
4. New configuration according to invention: Au black cathode including anion exchange ionomer//anion exchange ionomer thin film//Nafion® XL membrane//Pt/C GDE anode. The cathode compartment was fed with pure $CO_2$ gas at a flow of 10 ml/min and 100% RH, while the anode compartment was fed with $H_2$ at 10 ml/min and 100% RH.

All the investigated cells have a geometric active surface of 0.5 $cm^2$.

For investigating parasitic $CO_2$ pumping with the different cell configurations, galvanostatic current steps were applied from −2 mA to −50 mA with each current maintained for 2 min. The exhaust anode gas composition was analyzed by on-line MS.

FIG. 3 compares the results obtained for cells with an alkaline membrane, Au-based cathode and two different anodes: Once with a Pt/C GDE anode fed with $H_2$ (cell configuration 1) and once with an anode containing $IrTiO_2$ catalyst for oxygen evolution fed with highly humidified $N_2$ (cell configuration 2). The latter configuration corresponds to a full co-electrolyser cell. When no current is applied to the electrochemical cell, a small background signal is detected on the $CO_2$ channel of the MS (m/z=44). When electrical current is applied to the cell, a correlated increase of the $CO_2$ signal is detected with the MS for both cell configurations. In configuration 1, the Pt/C anode fed with $H_2$ acts as a pseudo-RHE reference electrode with a potential close to 0 V vs. RHE. At such low potential, no electrochemical oxidation of the carbonate/bicarbonate species is expected (see reactions 5 and 6). However, a small increase in the $CO_2$ signal at the anode side is observed also in this configuration. In this case, the $CO_2$ is formed according to reactions 7 and 8 of the carbonate/bicarbonate species of the anion exchange membrane with the protons resulting from the hydrogen oxidation reaction at the anode (HOR: $H_2 \rightarrow 2H^+ + 2e^-$). In the full co-electrolyser cell configuration 2, a significant amount of $CO_2$ is detected at the anode. In this case, the anode potential is increased and the electrochemical reactions 5 and 6 occur resulting in a significant amount of undesired $CO_2$ release. These results prove that, when an alkaline membrane is used in a co-electrolyser, a significant amount of $CO_2$ is pumped from cathode to anode side with the consequence that such a system is not efficient for the purpose of electrochemical $CO_2$ reduction.

The $CO_2$ release at the anode side in full co-electrolyser cell configuration 3 using a bipolar membrane was also tested and compared with the results for full co-electrolyser cell configuration 2 using an alkaline membrane. These results are shown in FIG. 4. When a bipolar membrane is used, the $CO_2$ release at the anode is significantly reduced compared to the system with an alkaline membrane. As explained above, in the case of a bipolar membrane the carbonate/bicarbonate species produced at the cathode are neutralized at the internal alkaline/acidic interface of the bipolar membrane (see reactions 7 and 8). The $CO_2$ detected at the anode side is a result of the diffusion of $CO_2$, formed in this way at the internal membrane interface, through the acidic part of the membrane to the anode side. Thus, using a bipolar membrane is only partially effective to prevent the $CO_2$ pumping from cathode to anode side.

FIG. 5 shows the MS measurement of $CO_2$ release at the anode obtained with the new cell configuration 4 in comparison with the cell configuration 1 using alkaline membrane. In the case of the new cell configuration 4, no $CO_2$ was detected at the anode side, showing the efficiency of this cell configuration to prevent the parasitic $CO_2$ pumping.

The invention claimed is:

1. An electrochemical co-electrolysis cell for the reduction of carbon dioxide, comprising a membrane electrode assembly (MEA), said MEA comprising:
   an anode electrode substrate,
   a cathode electrode substrate, and
   an acidic cation exchange polymer membrane disposed between the anode electrode substrate and the cathode electrode substrate,
   wherein the cathode electrode substrate comprises a mixture of a cathode catalyst material and an anion exchange ionomer and a continuous film layer of the anion exchange ionomer disposed on one side of the cathode electrode substrate,
   wherein the anion exchange ionomer film layer on the cathode electrode substrate assumes the porosity of the cathode electrode substrate upon which it is deposited to form a discontinuous contact interface with the cation exchange polymer membrane and to separate the cathode catalyst material from the cation exchange polymer membrane.

2. The electrochemical co-electrolysis cell according to claim 1, wherein the side of the cathode electrode substrate in contact with the anion exchange ionomer film layer has a 3D porous structure comprising the mixture of the cathode catalyst material and the anion exchange ionomer.

3. The electrochemical co-electrolysis cell according to claim 1, wherein a thickness of the anion exchange ionomer film layer is approximately 10% of a thickness of the cation exchange polymer membrane.

4. A process for fabricating an electrochemical co-electrolysis cell for the reduction of carbon dioxide containing a membrane electrode assembly (MEA) according to claim 1, said process comprising the steps of:
   (i) fabricating a cathode electrode substrate by coating a mixture of cathode catalyst material and anion exchange ionomer onto one side of a gas diffusion substrate;
   (ii) applying a spray coating of the anion exchange ionomer onto the cathode electrode substrate to form a film layer, wherein the anion exchange ionomer film layer on the cathode electrode substrate assumes the porosity of the cathode electrode substrate upon which it is deposited;
   (iii) bringing the anion exchange ionomer-coated side of the cathode electrode substrate into contact with one side of an acidic cation exchange polymer membrane to form a discontinuous contact interface; and
   (iv) bringing the opposite side of the acidic cation exchange polymer membrane into contact with an anode electrode substate.

5. An electrochemical co-electrolysis cell for the reduction of carbon dioxide, containing a membrane electrode assembly (MEA), said MEA comprising:
   an anode electrode,
   a cathode electrode, and
   an acidic cation exchange polymer membrane disposed between the anode electrode and the cathode electrode,
   wherein the cathode electrode comprises a mixture of a cathode catalyst material and an anion exchange ionomer,
   wherein a continuous film layer of the anion exchange ionomer is disposed on one side of the cathode electrode,
   wherein the anion exchange ionomer film layer on the cathode electrode assumes the porosity of the cathode electrode upon which it is deposited to form a discontinuous contact interface with the cation exchange polymer membrane and to separate the cathode catalyst material from the cation exchange polymer membrane.

* * * * *